United States Patent [19]

de Marees van Swinderen

[11] Patent Number: 4,777,757
[45] Date of Patent: Oct. 18, 1988

[54] ENCLOSED BAIT FISHING LURE

[76] Inventor: Wicher M. de Marees van Swinderen, P.O. Box 931, Scottsdale, Ariz. 85282

[21] Appl. No.: 93,632

[22] Filed: Sep. 8, 1987

[51] Int. Cl.[4] .............................................. A01K 97/04
[52] U.S. Cl. ...................................... 43/41; 43/42.05; 43/42.06; 43/42.36
[58] Field of Search .................... 43/42.06, 41, 44.99, 43/42.05, 42.36

[56] References Cited

U.S. PATENT DOCUMENTS

| 2,541,847 | 2/1951 | Van Kirk | 43/41 |
| 2,556,634 | 6/1951 | Redinger | 43/42.36 |
| 2,557,577 | 6/1951 | Soma | 43/42.36 |
| 4,033,063 | 7/1977 | Mize | 43/42.06 |
| 4,520,588 | 6/1985 | Hindermyer | 43/42.06 |
| 4,553,348 | 11/1985 | Cooper | 43/42.06 |
| 4,603,502 | 8/1986 | MacDonald | 43/44.99 |

FOREIGN PATENT DOCUMENTS 587017 11/1959 Canada .............................. 43/42.06

Primary Examiner—Gene P. Crosby
Attorney, Agent, or Firm—Harry M. Weiss & Associates

[57] ABSTRACT

Disclosed is an improved, easy to assemble fishing lure which utilizes the scent of any species of enclosed live bait to attract fish.

15 Claims, 1 Drawing Sheet

ENCLOSED BAIT FISHING LURE

BACKGROUND OF THE INVENTION

1. Field of the Invention

The present invention generally relates to an improved fishing lure and method and, more specifically, to an improved fishing lure and method which utilizes the scent of enclosed live bait to attract fish.

2. Description of the Prior Art

In the past, artificial fishing lure physically resembling live fish were used to attract and catch fish. It was soon discovered, however, that large ocean fish often swam up to the artificial lure, then swam away without attacking the lure, indicating that the lure either did not appeal to the fish or that the trolling speed was inaccurate. Soon, new lure was discovered which utilized the scent of artificial agents in the form of powders, oils, sprays, or pellets to attract fish. Any fishing lure utilizing live bait proved to be difficult to assemble and could not contain different species of bait. Therefore, a need existed for an easy to assemble fishing lure which utilized the scent of live bait to attract fish.

SUMMARY OF THE INVENTION

It is an object of this invention to provide an improved apparatus and method which utilizes the scent of live bait in a fishing lure.

It is a further object of this invention to provide an improved apparatus and method for luring fish which can accommodate a variety of bait sizes and species.

It is another object of this invention to provide an improved apparatus and method for luring fish which is easy to assemble.

It is a still further object of this invention to provide an improved apparatus and method for luring fish which utilizes easily exchangeable components.

The aforementioned and other objects are accomplished, according to the present invention, by a fishing lure which encloses a live bait in a hollow tube enclosed on the aft end by a perforated cap and surrounded by plastic skirts.

The foregoing and other objects, features and advantages of this invention will be apparent from the following, more particular, description of the preferred embodiments of this invention, as illustrated in the accompanying drawings.

DESCRIPTION OF THE PREFERRED EMBODIMENT

Figure 1:
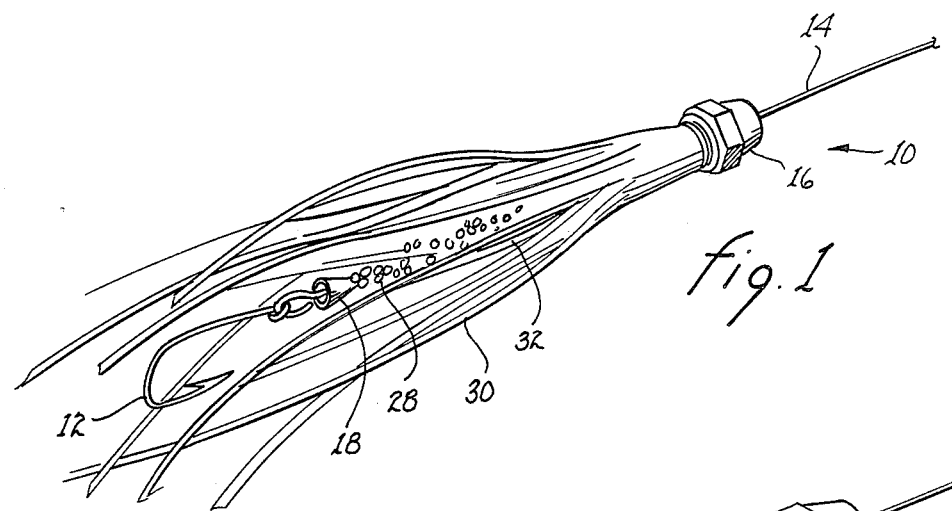
FIG. 1 is a perspective view of the improved enclosed live bait fishing lure.
Figure 2:
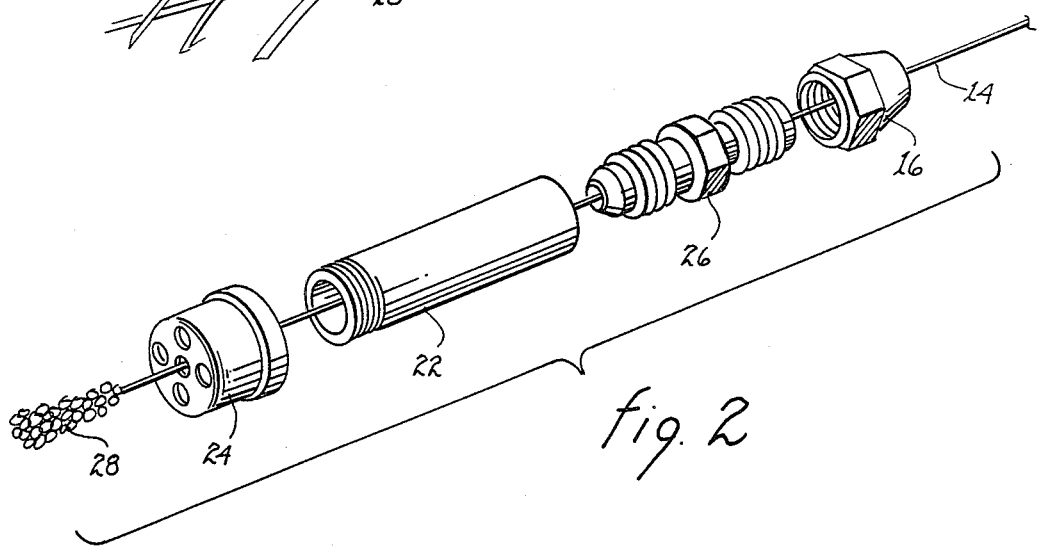
FIG. 2 is a perspective view of the improved enclosed live bait fishing lure with detached components.
Figure 3:
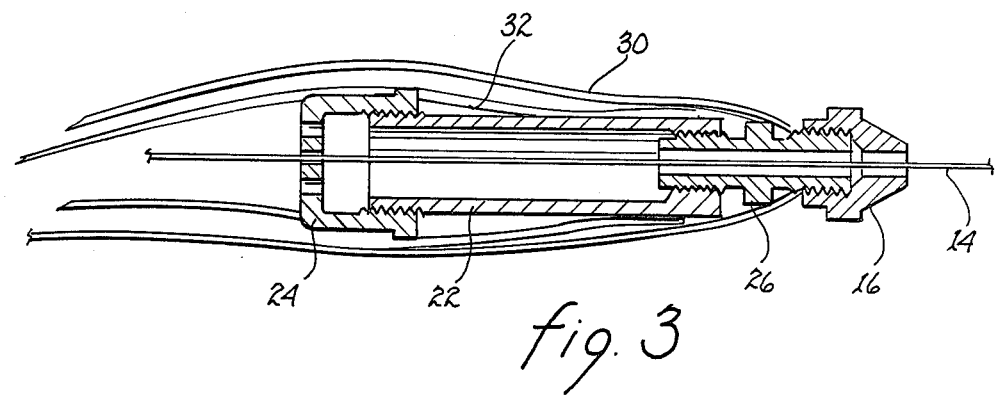
FIG. 3 is a cross-sectional view of the improved enclosed live bait fishing lure.

Referring now to FIG. 1 of the accompanying drawings which set forth the present invention in greater detail and in which like numerals designate like features, the enclosed live bait fishing lure 10 generally comprises a hook 12, a leader line 14, a flare nut 16, a coupler 26, a hollow pipe 22, a perforated cap 24, a crimping sleeve 18, a plurality of plastic skirts 30,32, and a plurality of preferably colored beads 28.

The leader line 14 is constructed out of monofilament or wire. The aft end of the leader line 14 is attached to the hook 12 with a crimping sleeve 18. The hook 12 is sized appropriately for the need of the angler.

The colored beads 28 are also attached to the aft end of the leader line 14. The beads 28 space the hook 12 at the desired distance from the fishing lure 10. The physical appearance of the beads 29 also serves to attract the fish.

The hollow tube 22 is preferably plastic. The perforated plastic cap 24 operably slides or screws onto the aft end of the tube 22. The hollow tube 22 contains the live bait. The plastic cap 24 seals the hollow tube 22 so that the live bait cannot escape. The plastic cap 24 is perforated to allow water to enter the hollow tube 22, and to release the scent of the live bait when the lure 10 is trolled.

The coupler 26 operably slides or screws into the forward end of the hollow tube 22. The coupler 26 then connects to the flare nut 16. The coupler 26 is preferably constructed from brass, and the flare nut 16 is preferably nickel-coated to prevent rusting.

SYSTEM OPERATION

Prior to use, the fishing lure 10 is assembled by first operably coupling the coupler 26 partially into the hollow tube 22. An inner skirt 30 is then fit over the brass coupler 26, after which the coupler 26 is tightened, pinching the inner skirt 30 between the hollow tube 22 and the coupler 26. An outer plastic skirt 32 is fit over the coupler 26. The flare nut 16 is then screwed onto the end of the coupler 26, securing the outer skirt 32.

The colored beads 28 are attached to the end of the leader line 14. The hook 12 is then attached to the leader line 14 with a crimping sleeve 18.

The opposite end of the leader line 14 is passed through the center hole of the perforated cap 24, the hollow tube 22, the coupler 26, and the flare nut 16.

After the fishing lure 10 is assembled, a live bait is inserted into the hollow tube 22, and the perforated cap 24 is screwed or slid on. The fishing lure 10 is then ready for use.

The term live bait is intended to include both live fish and freshly killed fish.

While the invention has been particularly shown and described in reference to the preferred embodiments thereof, it will be understood by those skilled in the art that changes in form and details may be made without departing from the spirit and scope of the invention.

I claim:

1. A fishing lure apparatus which encloses a bait comprising, in combination:
    hollow elongated means for containing said bait;
    cap means for operably sealing one end of said hollow elongated means;
    first coupling means for operably coupling to an end of said hollow elongated means;
    a leader line and hook coupled to said hollow elongated means; and
    a plurality of plastic skirts, further comprising a second coupling means for operably coupling said plastic skirts to said fishing lure.

2. A fishing lure which encloses a bait in accordance with claim 1 further comprising a plurality of beads.

3. A fishing lure which encloses a bait in accordance with claim 2 wherein said beads are attached to said leader line and hook.

4. A fishing lure which encloses a bait in accordance with claim 1 wherein said hollow elongated means is open on both ends.

5. A fishing lure which encloses a bait in accordance with claim 4 wherein said hollow elongated means is threaded on both ends.

6. A fishing lure which encloses a bait in accordance with claim 1 wherein said hollow elongated means is plastic.

7. A fishing lure which encloses bait in accordance with claim 1 wherein said cap means is threaded on one end to couple with said hollow elongated means.

8. A fishing lure which encloses a bait in accordance with claim 1 wherein said cap means is constructed out of plastic.

9. A fishing lure which encloses a bait in accordance with claim 1 wherein said cap means is perforated with a plurality of holes.

10. A fishing lure which encloses a bait in accordance with claim 1 wherein said first coupling means is threaded on both ends.

11. A fishing lure which encloses a bait in accordance with claim 1 wherein said first coupling means is constructed from brass.

12. A fishing lure which encloses a bait in accordance with claim 1 wherein said second coupling means is threaded on the aft end.

13. A fishing lure which encloses bait in accordance with claim 1 wherein said second coupling means is a flare nut.

14. A fishing lure which encloses a bait in accordance with claim 1 wherein said second coupling means is nickel-coated.

15. A method for luring fish with the scent of bait comprising the steps of:
   attaching a first coupling means to a hollow elongated means;
   crimping a hook to one end of a leader line;
   running said leader line through a perforated cap means;
   running said leader line through said hollow elongated means;
   running said leader line through said first coupling means;
   inserting said bait in said hollow elongated means;
   coupling said perforated cap means to said hollow elongated means; and
   thereinafter trolling said assembled lure through water, and coupling a plurality of plastic skirts to said fishing lure at least one of which being secured with a second coupling means.

* * * * *